United States Patent
Padgett et al.

(10) Patent No.: US 12,423,924 B2
(45) Date of Patent: Sep. 23, 2025

(54) METHODS FOR CALIBRATING AUGMENTED REALITY SCENES

(71) Applicant: Shopify Inc., Ottawa (CA)

(72) Inventors: Neil Leonard Padgett, Toronto (CA); Russ Maschmeyer, Berkeley, CA (US); Eric Andrew Florenzano, San Francisco, CA (US); Brennan Letkeman, Calgary (CA); Andrew Nhat-Nam Ngo, Toronto (CA); Hettige Ray Perera Jayatunga, Toronto (CA); James Lepp, Ottawa (CA); Diego Macario Bello, Montreal (CA)

(73) Assignee: Shopify Inc., Ottawa (CA)

( * ) Notice: Subject to any disclaimer, the term of this patent is extended or adjusted under 35 U.S.C. 154(b) by 215 days.

(21) Appl. No.: 18/082,706

(22) Filed: Dec. 16, 2022

(65) Prior Publication Data
US 2024/0087251 A1    Mar. 14, 2024

Related U.S. Application Data

(60) Provisional application No. 63/405,167, filed on Sep. 9, 2022.

(51) Int. Cl.
*G06T 19/00* (2011.01)
*G06F 3/01* (2006.01)
(Continued)

(52) U.S. Cl.
CPC ............ *G06T 19/006* (2013.01); *G06F 3/017* (2013.01); *G06T 3/14* (2024.01); *G06T 7/73* (2017.01);
(Continued)

(58) Field of Classification Search
CPC .......... G06T 19/006; G06T 7/73; G06T 3/14; G06T 2207/30204; G06T 19/00;
(Continued)

(56) References Cited

U.S. PATENT DOCUMENTS

| 7,707,501 B2 * | 4/2010 | Patel | G06F 3/0481 715/728 |
| 11,402,964 B1 * | 8/2022 | Stevens | G06F 16/9558 |

(Continued)

FOREIGN PATENT DOCUMENTS

WO    WO-2021061441 A1 *   4/2021   ........... G02B 27/017

OTHER PUBLICATIONS

Jack Purcher;'Patent Applications from Apple this week cover a Virtual PC Display concept for Mixed Reality eyewear and new dual vents for Apple Watch'; Aug. 28, 2022.
(Continued)

*Primary Examiner* — Kee M Tung
*Assistant Examiner* — Biao Chen
(74) *Attorney, Agent, or Firm* — Rowand LLP

(57) ABSTRACT

A computer-implemented method is disclosed. The method includes: determining a first position of a real display device in a real-world environment; receiving a request to display virtual information at a second relative position with respect to the first position in an AR version of the real-world environment; responsive to receiving the request: determining a displayable area associated with the second relative position; and causing the virtual information to be overlaid on the displayable area in the AR version of the real-world environment.

20 Claims, 9 Drawing Sheets

(51) Int. Cl.
  *G06F 3/04845*  (2022.01)
  *G06F 3/0486*  (2013.01)
  *G06T 3/14*  (2024.01)
  *G06T 7/73*  (2017.01)

(52) U.S. Cl.
  CPC ........ *G06F 3/04845* (2013.01); *G06F 3/0486* (2013.01); *G06T 2207/30204* (2013.01)

(58) Field of Classification Search
  CPC .... G06F 3/017; G06F 3/04845; G06F 3/0486; G06F 3/0484; G06F 3/0487; G06F 3/0488; G06F 3/01; G06F 3/04815; G09G 5/38; G09G 5/377; G06V 20/20
  See application file for complete search history.

(56) References Cited

U.S. PATENT DOCUMENTS

| | | |
|---|---|---|
| 2004/0161246 A1 | 8/2004 | Matsushita et al. |
| 2014/0306993 A1 | 10/2014 | Poulos et al. |
| 2016/0232715 A1* | 8/2016 | Lee ..................... G06F 3/011 |
| 2021/0247846 A1 | 8/2021 | Shriram et al. |
| 2021/0248669 A1 | 8/2021 | Wade et al. |

OTHER PUBLICATIONS

International Searching Authority; International Search Report and Written Opinion relating to Application No. PCT/CA2023/051063 dated Oct. 6, 2023.

\* cited by examiner

FIG. 9

METHODS FOR CALIBRATING AUGMENTED REALITY SCENES

CROSS-REFERENCE TO RELATED APPLICATION

The present application claims the benefit of priority to U.S. Provisional Patent Application No. 63/405,167 filed on Sep. 9, 2022, the contents of which are incorporated herein by reference.

TECHNICAL FIELD

The present disclosure relates to augmented reality and, in particular, to systems and methods for calibrating augmented reality scenes.

BACKGROUND

Real display devices, such as TVs and computer monitors, are generally capable of providing higher resolutions and better text readability compared to virtual display interfaces (e.g., virtual representation of a display screen) for visual output in augmented reality (AR). Real display devices may provide such benefits at the cost of taking up a fixed amount of physical space in a user's real-world environment. Virtual display devices in AR do not require dedicated physical space in the real world, and are useful for presenting 3D and virtual information.

BRIEF DESCRIPTION OF THE DRAWINGS

Embodiments will be described, by way of example only, with reference to the accompanying figures wherein:

FIG. 9 is an example of a home page of an administrator, in accordance with an example embodiment.

Like reference numerals are used in the drawings to denote like elements and features.

DETAILED DESCRIPTION OF EMBODIMENTS

Figure 1:
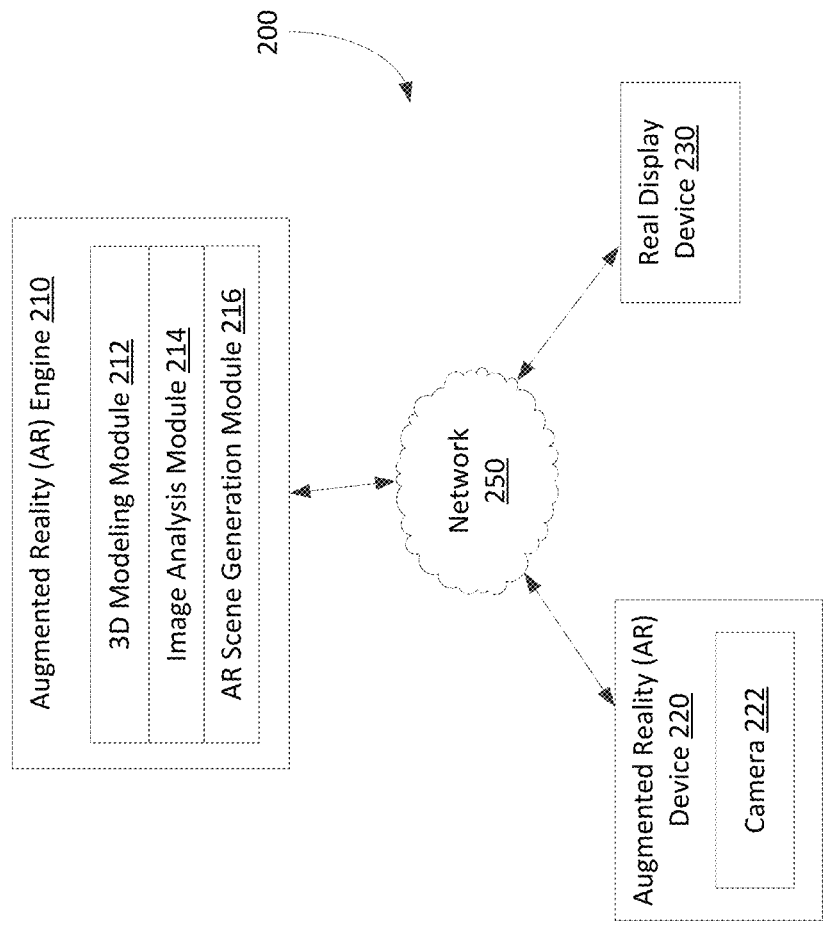
FIG. 1 illustrates an example system for calibrating augmented reality scenes.

In an aspect, the present application discloses a computer-implemented method. The method includes: determining a first position of a real display device in a real-world environment; receiving a request to display virtual information at a second relative position with respect to the first position in an AR version of the real-world environment; responsive to receiving the request: determining a displayable area associated with the second relative position; and causing the virtual information to be overlaid on the displayable area in the AR version of the real-world environment.

In some implementations, determining the first position may include determining real-world space coordinates associated with a location of the real display device in the real-world environment.

In some implementations, the method may further include monitoring user interaction with the real display device, and the request to display the virtual information may comprise a detected user interaction input associated with the real display device.

In some implementations, the user interaction input may comprise one of: a drag-and-drop gesture using an input device; a gesture for moving one or more UI elements displayed on a display area of the real display device; or a gesture for moving one or more virtual UI elements shown as overlay on the real display device in AR.

In some implementations, the second relative position may be determined based on an end position associated with the detected user interaction input.

In some implementations, the method may further include obtaining sensor data of sensors for tracking gestures of the user, and gestures of the user in the real-world environment may be detected based on the obtained sensor data.

In some implementations, the sensors may comprise at least one of: cameras; LiDAR array; eye trackers; or hand trackers.

In some implementations, the method may further include causing to be displayed, on a displayable area associated with the real display device, a visual marker for use in positional synchronization of the AR scene.

In some implementations, the visual marker may comprise at least one of a pattern or a fiducial.

In some implementations, the method may further include: determining that a positional synchronization with the real display device has been lost; responsive to determining that the positional synchronization has been lost: obtaining image data captured using cameras associated with an AR-enabled computing device; detecting the visual marker in the image data; and causing the AR scene to be positionally synchronized based on the detected visual marker.

In some implementations, the method may further include: determining that a positional synchronization with the real display device has been lost; responsive to determining that the positional synchronization has been lost: determining a defined third position in the real-world environment; and causing the AR scene to be positionally synchronized relative to the defined third position.

In some implementations, the defined third position may comprise one of: a last stored position of the real display device; a location of a detectable landmark in the AR version of the real-world environment; or a current position of an AR-enabled computing device.

In some implementations, the displayable area associated with the second relative position may comprise a virtual display screen overlaid on a view of the real-world environment.

In another aspect, the present application discloses a computing system. The computing system includes a processor and a memory coupled to the processor. The memory stores computer-executable instructions that, when executed, configure the processor to: determine a first position of a real display device in a real-world environment; receive a request to display virtual information at a second relative position with respect to the first position in an AR version of the real-world environment; responsive to receiving the request: determine a displayable area associated with the second relative position; and cause the virtual information to be overlaid on the displayable area in the AR version of the real-world environment.

In another aspect, the present application discloses a non-transitory, computer-readable medium storing computer-executable instructions that, when executed by a processor, configure the processor to carry out at least some of the operations of a method described herein.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " is intended to cover any one or more of the listed elements, including any one of the listed elements alone, any sub-combination, or all of the elements, without necessarily excluding any additional elements, and without necessarily requiring all of the elements.

In the present application, the term "product data" refers generally to data associated with products that are offered for sale on an e-commerce platform. The product data for a product may include, without limitation, product specification, product category, manufacturer information, pricing details, stock availability, inventory location(s), expected delivery time, shipping rates, and tax and tariff information. While some product data may include static information (e.g., manufacturer name, product dimensions, etc.), other product data may be modified by a merchant on the e-commerce platform. For example, the offer price of a product may be varied by the merchant at any time. In particular, the merchant may set the product's offer price to a specific value and update said offer price as desired. Once an order is placed for the product at a certain price by a customer, the merchant commits to pricing; that is, the product price may not be changed for the placed order. Product data that a merchant may control (e.g., change, update, etc.) will be referred to as variable product data. More specifically, variable product data refers to product data that may be changed automatically or at the discretion of the merchant offering the product.

In the present application, the term "e-commerce platform" refers broadly to a computerized system (or service, platform, etc.) that facilitates commercial transactions, namely buying and selling activities over a computer network (e.g., Internet). An e-commerce platform may, for example, be a free-standing online store, a social network, a social media platform, and the like. Customers can initiate transactions, and any associated payment requests, via an e-commerce platform, and the e-commerce platform may be equipped with transaction/payment processing components or delegate such processing activities to one or more third-party services. An e-commerce platform may be extended by connecting one or more additional sales channels representing platforms where products can be sold. In particular, the sales channels may themselves be e-commerce platforms, such as Facebook Shops™, Amazon™, etc.

Calibration of Augmented Reality Scenes

Augmented reality systems combine virtual, or computer-generated, information with a view of a real-world environment in providing AR experiences. A key measure of AR systems is the capacity for integrating augmentations with the real world. AR scenes are generated by overlaying virtual content on a real-world view. A robust AR system may enable effective registration, tracking, and calibration of the position and orientation of virtual overlays. Specifically, the accuracy of the relative position and orientation of virtual overlays with respect to real world objects may serve as an indicator of effectiveness of an AR system.

As a particular example, real display devices may include physical objects (e.g., TVs, monitors, and the like) in a real-world environment that are adapted for outputting display data. A real display device renders information on an output interface for viewing in the real world. Such a real display device may be augmented in AR by projecting virtual information as overlay content in a real-world view of the device. For example, computer-generated content, such as text, images, etc., may be overlaid onto a real-life local view of a monitor screen, thereby extending the display capacity of the monitor. In this way, virtual content may, in AR, augment the display data that is rendered on a real display device.

In contrast to real display devices, a virtual display device is or includes a display interface that is virtually represented in AR. Virtual display devices may display virtual information in 2D or 3D, and do not require dedicated physical space in the real world. Since a virtual display device and display data rendered thereon are entirely computer-generated, the display resolution of the virtual display device may be limited by constraints on computing resources of the AR system and/or the AR-enabled computing devices that are used for viewing the virtual information in AR. As such, real display devices are generally capable of providing higher resolutions and better text readability compared to virtual display interfaces for visual output.

Although a virtual display could be used to replace a real display device, virtual displays may be useful for augmenting, rather than supplanting, real display devices for enhanced viewing and interactive experiences in AR. By way of example, a virtual display device may be used to mirror or extend a display screen (e.g., desktop) of a real monitor. An AR system may, for example, detect a real monitor in the real world and generate related virtual display interfaces, viewable in AR, for mirroring or extending a display screen of the real monitor. The virtual display interfaces may thereby increase the overall screen capacity for display and user interaction. As another example, an AR system may be configured to detect user interaction with display content that is rendered on a real display device and to cause relevant information to be output via related virtual display interfaces. For example, user selection of a user interface element (e.g., an HTML button) that is rendered on a real display device may trigger an AR system to determine relevant document data (e.g., a linked webpage) associated with the selection and to cause display content associated with the document to be output on one or more virtual display interfaces.

The present invention encompasses methods for anchoring virtual display interfaces on a positionally fixed real display device in AR. Specifically, techniques for arranging virtual display interfaces relative to a real monitor in AR scenes are disclosed. The accuracy of initial positioning of AR scenes may be improved by anchoring scenes on visual markers (e.g., fiducials of known pattern and size) associated with a real monitor. Scene calibration for AR may benefit from anchoring the display of virtual information on a real monitor.

In accordance with disclosed implementations, the placement of virtual (i.e., computer-generated) elements in an AR scene may be anchored on a real monitor. Specifically, a virtual element may be rendered in an AR scene at a position and in an orientation that are defined relative to a real monitor so as to, for example, cause the virtual element to appear fixed or otherwise bound or tethered to the real monitor. Put another way, the coordinates of augmented content may be moored to the three-dimensional location, orientation, and/or scale of a real monitor or parts thereof (e.g., monitor screen, bezel, a specific detectable point or region or plane or edge of the monitor, etc.). The position and orientation of the real monitor or parts thereof may be tracked, for example, based on image analysis of videos that are captured using cameras of an AR-enabled computing device.

A real monitor may display and/or include at least one visual marker that is detectable by cameras of an AR-enabled computing device, such as a mobile phone or a head-mounted display (IMD). A visual marker may, for example, be an object or pattern that is placed in the field of view of one or more of the cameras for use as a point of reference, (e.g., a fiducial). A fiducial may be printed on, attached to, or otherwise physically disposed on the real monitor (e.g., a logo engraved on the monitor). In some implementations, an AR overlay content that occludes a visual marker may be provided for controlling visibility of the visual marker. For example, the visual marker may be rendered visible (i.e., by removing the occluding AR overlay) when it is needed for, for example, obtaining information from the visual marker, and/or initiating defined actions that may require user interaction with the visual marker (e.g., because it also is or comprises or is otherwise disposed on or occludes a button).

Alternatively, the visual marker may be software-generated and rendered visible on a display interface (e.g., a monitor screen) associated with the real monitor. A software-generated, or virtual, visual marker may be controlled using a computer. In particular, a controller, such as a processor or microprocessor, associated with the real monitor may control the appearance (e.g., shape, color, and the like), location on screen, etc. of a virtual marker as desired. Advantageously, a virtual marker may be detectable even in poor visibility conditions, such as a dimly lit room, potentially by suitably adjusting the appearance of the marker based on such conditions.

For example, for virtual markers, visibility information describing visibility of content on a real monitor may first be determined, and display properties for one or more virtual markers to display on the real monitor may be controlled based on the visibility information. The visibility of content on a real monitor may depend on various factors such as ambient lighting, colour contrast, text and image size, and the like. In some implementations, the visibility information may be determined based on camera and/or sensor data. For example, the visibility information associated with a real monitor located in a room may be determined using a feedback loop with sensor output from cameras or other sensors of an AR-enabled computing device that is used in the room being provided as input to a controller of the real monitor. In particular, the camera/sensor data from the AR-enabled computing device may be transmitted, via, for example, a bus or computer network, to a processor associated with the real monitor.

By way of example, an ambient light sensor associated with an AR-enabled computing device (or a real monitor) may be used to determine the amount of ambient light present in a space surrounding the real monitor, and the brightness of one or more virtual markers for display on the real monitor may be controlled based on the ambient light information. As another example, image data from cameras of an AR-enabled computing device may be used for determining color, size, location, etc. of content items that are displayed on a real monitor, and corresponding display properties of one or more virtual markers for displaying on the real monitor may be controlled based on the image data.

A virtual marker may be or include a barcode, a fiducial, and/or other machine-readable indicia, and may be used to encode various information. In some implementations, a virtual marker may be overlaid with other information (i.e., that can only be seen when viewed in AR). For example, to avoid displaying private or sensitive information on a real monitor screen, a virtual fiducial may be displayed on the real monitor screen, while an authorized user may be able to view, using an AR-enabled computing device, private/sensitive information in place of the fiducial in AR.

The visual marker may be imaged using cameras of the AR-enabled computing device, and an associated AR processing system, such as an AR engine, may determine the current location, orientation, and scale of the real monitor screen in real-world space using the visual marker. (Here, "real-world space" describes, e.g., that which can be detected by the cameras of the AR-enabled computing device and assigned coordinates by the associated AR engine; the term is not prescriptive of any particular coordinate system.) In particular, the visual marker may be associated with relative information describing the location, orientation, and scale of the visual marker with respect to the real monitor screen. The corresponding real-world space information for the real monitor screen (e.g., real-world coordinates) may then be determined based on the detected position, orientation, and/or size of the visual marker. The visual marker that is associated with a real monitor may also encode the relative information for the real monitor.

The visual marker may be associated with additional information (e.g., monitor type, authenticated users, etc.) relating to the real monitor. The visual marker may, for example, encode a specific value corresponding to the real monitor such that the monitor may be uniquely identifiable based on the visual marker (e.g., a serial number). As another example, a virtual visual marker may encode metadata identifying a reference (e.g., a URL, filename, etc.) to a location storing data that is to be displayed for viewing in AR (e.g., a digital twin of the real monitor, or some other object). An AR-enabled computing device may be configured to, upon detecting and decoding the visual marker, retrieve the data from the identified location, via a computer network. The data may, for example, be replacement data for rendering in place of the visual marker such that the replacement data, and not the visual marker, is viewable in AR.

An AR device may lose positional synchronization with a real monitor anchor. For example, when the real monitor (or a visual anchor such as a fiducial) is not detected in images captured using cameras of the AR device, a synchronization loss may be identified. As another example, in a space containing multiple real monitors, the AR device may fail to recognize, or incorrectly recognize (and, for example, detect a sudden and improbable movement of), the one of the real monitors that was previously set as an anchor (e.g., the one of the real monitors that was associated with a visual marker being used as an anchor) for AR scenes viewable using the AR device. For example, a location of the current anchor may be detected to have changed without actual or comparable change in location of the designated real monitor anchor. Upon detecting a failure to recognize the correct real monitor anchor, a synchronization loss may be identified.

The anchor data may be calibrated responsive to detecting certain defined conditions. The calibration may, for example, be performed based on a defined schedule or upon detecting that the AR device has undergone substantial changes in position and/or orientation. Additionally, or alternatively, the anchor data may be calibrated if loss of positional synchronization is detected, for example, in accordance with above-described techniques. An AR engine may cause a fiducial to be displayed on the real monitor screen to allow calibration. Specifically, the AR device may transmit instructions, via a computer network, to a controller associated with the real monitor to display a fiducial thereon.

The fiducial may be displayed for a defined period of time or until dismissed, for example, by a user of the computing device. For example, the fiducial may be displayed only briefly such that it is not visually apparent but still detectable, e.g., by virtue of persistence of vision. In some implementations, the fiducial may be persistently displayed. Alternatively, the fiducial may be caused to be displayed as necessary. Such "ephemeral" markers may be displayed, for example, periodically, upon detecting a calibration drift, or upon detecting a defined condition. The condition may, for example, be one indicative of or suggestive of a calibration drift (or possible calibration drift). The frequency and/or duration of the ephemeral markers may be determined based on a magnitude associated with the defined condition (e.g., an increase in a number, frequency, and/or magnitude of detected errors and/or anomalies).

The AR engine may be communicably connected to sensors (e.g., cameras, motion tracking sensors, LiDAR scanner, etc.) and may be configured to determine the nature of a user's interaction with real and virtual displays in AR. For example, the AR engine may be configured to detect the user's motion and gestures in real-time based on sensor data obtained via the sensors.

In some implementations, the AR engine may process video data of a video (e.g., live video stream) depicting a real-world environment to recognize a real monitor screen and determine a current location and orientation of the real monitor screen in real-world space. The real monitor may be recognized in the video data based on existing 3D model(s) of the real monitor and known information (e.g., monitor dimensions, shape, and the like) about the real monitor. The positioning of virtual elements for AR scenes can then be anchored on the location and orientation of the real monitor screen. In particular, the virtual elements can be positionally arranged in relation to the location of the real monitor screen.

Display content in AR (e.g., virtual UI elements such as windows, widgets, and the like) may be visualized using an AR-enabled computing device. The AR engine may cause the display content to be presented on a real display device, on virtual displays, or over other portions of a view of the real-world environment. When a user's request to display information in AR is received, the AR engine determines whether the information is to be rendered on a real monitor or superimposed on an AR scene of the real-world environment as virtual overlay. In particular, the AR engine may determine a displayable area for the requested display information. For a real display device, the display content may be rendered directly on a real screen of the device. For virtual displays, the display content, e.g., virtual 3D information, may be presented in AR by positioning and orienting the display content relative to a fixed real display device. For example, the display content may be overlaid on a display area (e.g., a virtual monitor screen) associated with a virtual display.

When displaying content on a virtual display in AR, the content may first need to be processed and suitably manipulated prior to rendering on the virtual display. In particular, images that are displayed or generated for displaying on a real display device may undergo certain 3D transforms, such as translation, rotation, shear, reflection, and scaling, prior to being rendered on a corresponding virtual display. The transformations of the images may be determined based on attributes of the virtual display, such as its type (e.g., 4K or HD monitor), location, orientation, size, and the like. For example, if the virtual display emulates a real 4K or HD monitor, the pixels of the real monitor would be processed (e.g., using image scaling techniques) in order to fit into the corresponding pixels of the virtual display. More broadly, the images may be pre-processed or the scaled images may be processed in order to remove artifacts such as moiré patterns. Various techniques for removing scaling artifacts (e.g., low-pass filtering) may be employed in processing the images. Where applicable, the content may also be cropped based on, for example, the detection of occluding objects (e.g., a real couch placed, in the real world, in front of where the AR overlay is supposed to make the content appear).

A user can cause virtual display information to "move" between a display area of a real display device and viewable virtual space around the real display device in AR. The UI elements may include virtual screens (for display of 2D content), application windows or sub-windows (e.g., a toolbar for an application), or OS features (e.g., a widget, notification pane, and the like). In this way, the display area of a real display device can effectively be extended on to virtual displays, allowing users to move seamlessly between real and virtual displays. The user can selectively move UI elements by any one of the following: drag-and-drop using an input device such as a keyboard, mouse, or touchpad; a gesture for interacting with the UI elements as displayed on a real or virtual display; and the like.

In AR, users may toggle between 2D and 3D views, and users may be able to choose between 2D or 3D display of content. In the case of non-headset AR experience (e.g., using a mobile device), 3D content may still be displayed but would be shown as a 2D image—the 2D image would change depending on the position and orientation of the mobile device relative to the anchoring real display device.

In some implementations, real objects other than a real display device may be used, individually or as part of a group of objects that includes a real display device, to anchor virtual display spaces. The real objects are recognizable using an AR-enabled computing device. An AR engine may make use of multiple real objects/display devices for anchoring multiple different virtual display spaces.

The anchoring of virtual display spaces to a specific real object may be ended if the user moves away from the real object or if the real object is removed from its fixed location. If positional synchronization with the real object is lost, the anchor may be updated. For example, if the real object cannot be detected or its location cannot be ascertained, the anchor for the virtual display devices may be set to a different position. In some embodiments, the last known real-world position of the anchoring real object may be set as the current anchor position. As another example, an AR-enabled computing device used for viewing in AR may itself be set as the current anchor, such that virtual display spaces appear in fixed positions in the field of view. In some implementations, the AR engine may "close" one or more of the virtual display spaces or otherwise cease displaying them (e.g., by minimizing, replacing with representative UI element(s), replacing with a "lock screen", etc.). As another example, a different real-world object (e.g., a display screen mounted on a wall) and/or associated visual markers may be set as an anchor.

Reference is first made to FIG. 1, which illustrates, in block diagram form, an example system 200 for generating and calibrating augmented reality scenes. As shown in FIG. 1, the system 200 may include an AR engine 210, AR devices 220, real display devices 230, and a network 250 connecting one or more of the components of system 200.

The AR engine 210, the AR devices 220, and the real display devices 230 may all communicate via the network 250. In at least some embodiments, each of the AR devices 220 and the real display devices 230 may be a computing device. The AR devices 220 and the real display devices 230 may take a variety of forms such as, for example, a mobile communication device such as a smartphone, a tablet computer, a wearable computer (such as smart glasses, augmented reality/mixed reality headset, etc.), a laptop or desktop computer, or a computing device of another type.

The AR device 220 is a computing device that is adapted for providing an augmented reality experience. Specifically, the AR device 220 is configured to combine real world and computer-generated content, by augmenting a view of a real-world environment with virtual overlay data. The AR device 220 may take various forms such as an optical see-through display, a video see-through display, a handheld device (e.g., a smartphone), or the like. As shown in FIG. 1, the AR device 220 includes certain sensors, such as a camera 222, that can be used to collect sensor data. The sensors of the AR device 220, which may include, for example, cameras, LiDAR scanners, microphones, eye trackers, hand trackers, and the like, may be configured to capture data for use in generating AR scenes of real-world environments. A user may capture live image or video data depicting their real-world surrounding space using their AR device 220, and the captured image/video data may be overlaid with computer-generated information to generate AR scenes depicting the real-world space. Using their AR device 220, a user can view, edit, manipulate, and otherwise interact with AR scenes featuring various objects of interest. In particular, the AR device 220 and associated sensors may be configured to detect, capture, and recognize user input, such as speech, gestures, and the like, as a user interacts with an AR environment.

A real display device 230 is a real output device for presenting information, such as images, text, or video, in visual and/or tactile form. In at least some embodiments, the real display device 230 may be an electronic visual display. The real display device 230 may take various forms such as a television set, a computer monitor, digital signage, or the like. The real display device 230 is configured to receive display data that is transmitted electronically and to output the display data via an output interface (e.g., a touchscreen). The display data may be received via a computing device that is communicably connected to the real display device 230. For example, the real display device 230 may be an output interface associated with a computing device such as a laptop computer, a tablet computer, or a mobile phone.

An AR engine 210 is provided in the system 200. The AR engine 210 may be a software-implemented component containing processor-executable instructions that, when executed by one or more processors, cause a computing system to carry out some of the processes and functions described herein. In some embodiments, the AR engine 210 may be provided as a stand-alone service. In particular, a computing system may engage the AR engine 210 as a service that facilitates providing an AR experience for users of the AR devices 220.

The AR engine 210 supports generation of AR content, such as AR scenes of real-world spaces. The AR engine 210 is communicably connected to one or more AR devices 220. Sensor data from AR devices 220 may be used in generating AR scenes. For example, AR devices 220 may transmit captured camera and LiDAR scanner data directly to the AR engine 210, or camera/LiDAR scanner data from AR devices 220 may be received at the AR engine 210 via an intermediary computing system. The AR scene data generated by the AR engine 210 may be transmitted, in real-time, to the AR device 220 for viewing thereon. For example, the AR engine 210 may be configured to generate and transmit, to the AR device 220, virtual overlay data associated with AR scenes.

As shown in FIG. 1, the AR engine 210 may include a 3D modeling module 212, an image analysis module 214, and an AR scene generation module 216. The modules may comprise software components that are stored in a memory and executed by a processor to support various functions of the AR engine 210.

The 3D modeling module 212 can be configured to perform operations for constructing, editing, storing, and manipulating 3D models of subjects. A subject may be a person, a physical item, or a real-world space. The 3D modeling module 212 may obtain subject information (e.g., image and video data, measured range/depth data, etc.) and generate a virtual 3D representation of the subject based on the obtained information.

The image analysis module 214 can be configured to analyze images stored and/or received by the AR engine 210. The image analysis module 214 receives images, videos, and the like as input, and outputs information regarding the image. Various algorithms may be included in or implemented by the image analysis module 214; non-limiting examples of such algorithms include: object recognition algorithms, image segmentation algorithms; surface, corner, and/or edge detection algorithms; and motion detection algorithms. In particular, the image analysis module 214 can detect objects in images and identify features of the detected objects.

The AR scene generation module 216 can be configured to generate AR scenes by combining real and virtual (i.e., computer-generated) information. For example, the AR scene generation module 216 may obtain a 3D model of a real-world space (e.g., a room, hallway, etc.) and overlay the 3D model onto the real-world space using AR. The AR scene generation module 216 determines how to align the 3D model with the real-world space. AR scenes containing the aligned model can be provided by the AR scene generation module 216, for example, via AR-enabled computing devices (e.g., head-mounted displays).

The AR engine 210, the AR devices 220, and the real display devices 230 may be in geographically disparate locations. Put differently, the AR devices 220 may be remote from one or more of: AR engine 210, and the real display devices 230. As described above, the AR devices 220, the real display devices 230, and the AR engine 210 may be computing systems.

The network 250 is a computer network. In some embodiments, the network 250 may be an internetwork such as may be formed of one or more interconnected computer networks. For example, the network 250 may be or may include an Ethernet network, an asynchronous transfer mode (ATM) network, a wireless network, or the like.

In some example embodiments, the AR engine 210 may be integrated as a component of an e-commerce platform. That is, an e-commerce platform may be configured to implement example embodiments of the AR engine 210. More particularly, the subject matter of the present application, including example methods for constructing 3D models and generating AR scenes disclosed herein, may be employed in the specific context of e-commerce.

Figure 2:
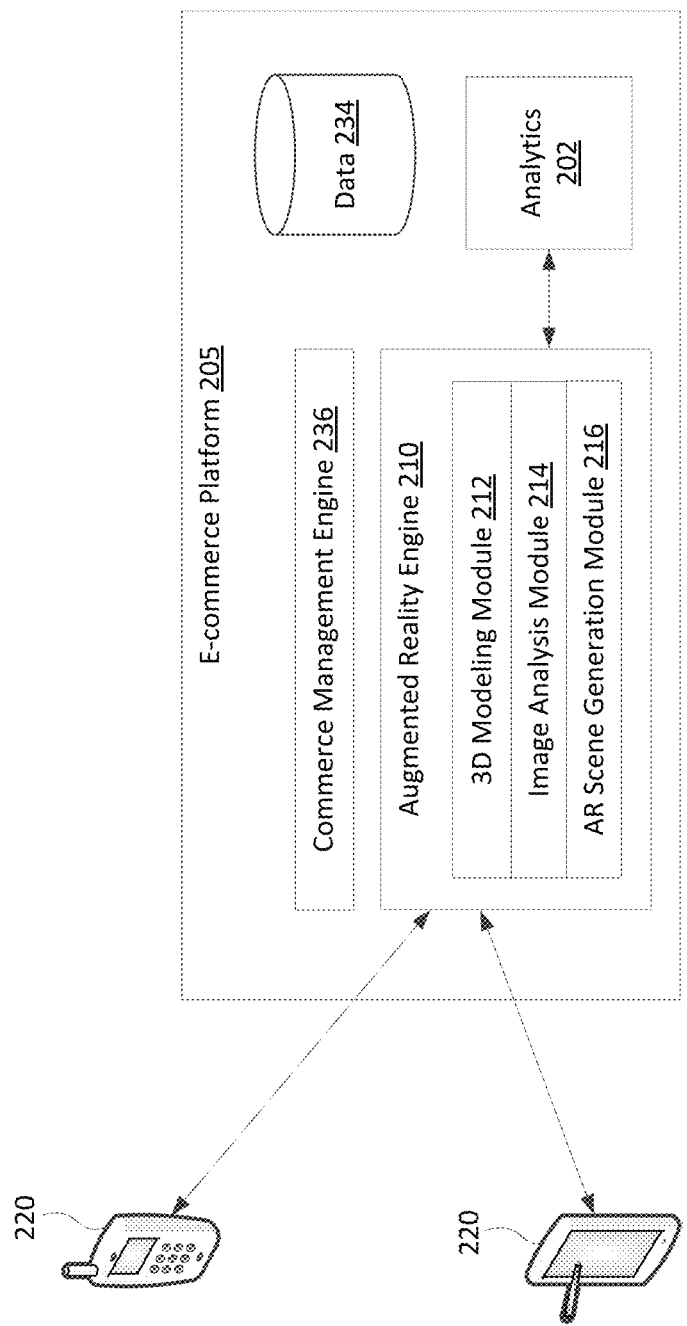
FIG. 2 is a block diagram of an e-commerce platform that is configured for implementing example embodiments of the AR engine of FIG. 1.

Reference is made to FIG. 2 which illustrates an example embodiment of an e-commerce platform 205 that implements an AR engine 210. The AR devices 220 may be communicably connected to the e-commerce platform 205. In at least some embodiments, the AR devices 220 may be associated with accounts of the e-commerce platform 205. Specifically, the AR devices 220 may be associated with individuals that have accounts in connection with the e-commerce platform 205. For example, one or more AR devices 220 may be associated with customers (e.g., customers having e-commerce accounts) or merchants having one or more online stores in the e-commerce platform 205. The e-commerce platform 205 may store indications of associations between AR devices and customers or merchants of the e-commerce platform, for example, in the data facility 234.

The e-commerce platform 205 includes a commerce management engine 236, an AR engine 210, a data facility 234, and a data store 202 for analytics. The commerce management engine 236 may be configured to handle various operations in connection with e-commerce accounts that are associated with the e-commerce platform 205. For example, the commerce management engine 236 may be configured to retrieve e-commerce account information for various entities (e.g., merchants, customers, etc.) and historical account data, such as transaction events data, browsing history data, and the like, for selected e-commerce accounts.

The functionality described herein may be used in commerce to provide improved customer or buyer experiences. The e-commerce platform 205 may implement the functionality for any of a variety of different applications, examples of which are described herein. Although the AR engine 210 of FIG. 2 is illustrated as a distinct component of the e-commerce platform 205, this is only an example. An engine could also or instead be provided by another component residing within or external to the e-commerce platform 205. In some embodiments, one or more applications that are associated with the e-commerce platform 205 may provide an engine that implements the functionality described herein to make it available to customers and/or to merchants. Furthermore, in some embodiments, the commerce management engine 236 may provide that engine. However, the location of the AR engine 210 may be implementation specific. In some implementations, the AR engine 210 may be provided at least in part by an e-commerce platform, either as a core function of the e-commerce platform or as an application or service supported by or communicating with the e-commerce platform. Alternatively, the AR engine 210 may be implemented as a stand-alone service to clients such as a customer's AR device. For example, an AR device could store and run an engine locally as a software application.

The AR engine 210 is configured to implement at least some of the functionality described herein. Although the embodiments described below may be implemented in association with an e-commerce platform, such as (but not limited to) the e-commerce platform 205, the embodiments described below are not limited to e-commerce platforms.

The data facility 234 may store data collected by the e-commerce platform 205 based on the interaction of merchants and customers with the e-commerce platform 205. For example, merchants provide data through their online sales activity. Examples of merchant data for a merchant include, without limitation, merchant identifying information, product data for products offered for sale, online store settings, geographical regions of sales activity, historical sales data, and inventory locations. Customer data, or data which is based on the interaction of customers and prospective purchasers with the e-commerce platform 205, may also be collected and stored in the data facility 234. Such customer data is obtained on the basis of inputs received via AR devices associated with the customers and/or prospective purchasers. By way of example, historical transaction events data including details of purchase transaction events by customers on the e-commerce platform 205 may be recorded and such transaction events data may be considered customer data. Such transaction events data may indicate product identifiers, date/time of purchase, final sale price, purchaser information (including geographical region of customer), and payment method details, among others. Other data vis-A-vis the use of e-commerce platform 205 by merchants and customers (or prospective purchasers) may be collected and stored in the data facility 234.

The data facility 234 may include customer preference data for customers of the e-commerce platform 205. For example, the data facility 234 may store account information, order history, browsing history, and the like, for each customer having an account associated with the e-commerce platform 205. The data facility 234 may additionally store, for a plurality of e-commerce accounts, wish list data and cart content data for one or more virtual shopping carts.

Figure 3:
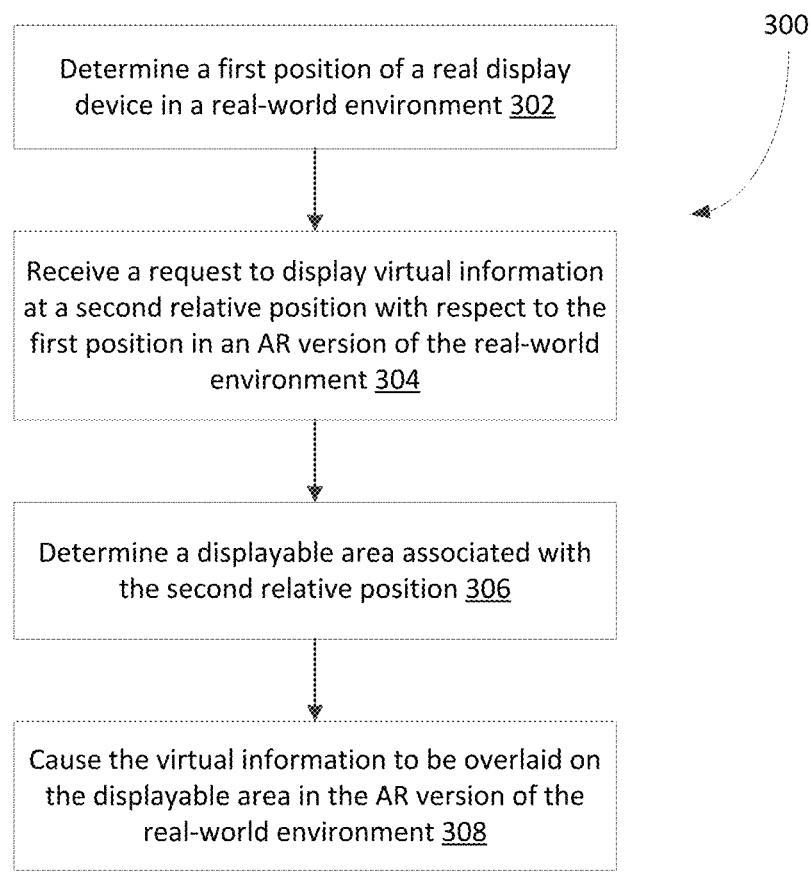
FIG. 3 shows, in flowchart form, an example method for displaying virtual display interfaces using a real display device as anchor in AR.

Reference is now made to FIG. 3, which shows, in flowchart form, an example method 300 for displaying virtual display interfaces in AR. Specifically, the method 300 may facilitate providing virtual display interfaces that use one or more real display devices as calibration anchors. The method 300 may be performed by a computing system that supports generation of AR content, such as the AR engine 210 of FIG. 1. As detailed above, an AR engine may be a service that is provided within or external to an e-commerce platform. An AR engine may implement the operations of method 300 as part of a process for generating and calibrating AR scenes.

AR-enabled computing devices ("AR devices") may be used to visualize a real-world space. Using an AR device, a user may view a real object, such as a real display device, and its surrounding environment. For example, the user may be positioned in front of a real display device such as a TV, a computer monitor, etc. when using the AR device, and the real display device may be located within a field of view of the AR device. In some embodiments, the AR device may be configured to detect certain real objects, such as a real display device, that are present within the device's field of view. For example, the AR device may process image and/or video data collected using cameras or other imaging sensors of the AR device and determine whether a real display device is present by using suitable object recognition techniques.

In operation 302, the AR engine determines a first position of a real display device in a real-world environment. In particular, the AR engine may determine coordinates corresponding to the real display device within a real-world coordinate system, i.e., a coordinate system overlaid upon the real world. The coordinates determined by the AR engine may represent a specific real-world location of the real display device. The AR engine may, for example, determine real-world coordinates corresponding to the positions of certain features (e.g., corners, edges, etc.) of the real display device or a position of a defined reference point associated with the real display device. The reference point may, in some embodiments, be a visual marker, such as a fiducial, that is printed on, attached to, or otherwise physically disposed on the real display device (e.g., a logo engraved on the monitor). The visual marker may, for example, be an object or marking of known pattern and size that is detectable in images of the real display device.

In at least some embodiments, the first position of the real display device is determined based on image analysis performed on images and/or videos captured using the AR device. That is, the real-world coordinates may be derived using image coordinates that correspond to a position of the real display device in images. The AR engine may obtain at least one image depicting the real display device via camera(s) of an AR device. Using object detection, the AR engine may recognize the real display device in the image and determine its location within the image, representing the device location in image coordinates. The image coordinates may then be converted to real-world coordinates using the parameters of the AR device's camera(s) and a suitable image-to-world transform.

The real-world coordinates associated with a location of the real display device represent static reference data which can be used in calibrating positions of virtual display interfaces that are related to the real display device. Virtual display interfaces may be arranged relative to a real display device in AR scenes using the reference data. In particular, the coordinates of augmented content associated with the virtual display interfaces may be moored to the real-world location, orientation, and/or scale of the real display device.

In operation 304, the AR engine receives a request to display virtual information at a second relative position with respect to the first position in an AR version of the real-world environment. In some embodiments, the request may be received via an input interface associated with the real display device. For example, a user of the real display device (e.g., a computer monitor) may provide input for requesting that certain information be displayed via one or more virtual display interfaces that are viewable in AR. The input may, for example, be a selection of a user interface element, displayed on the real display device, that is associated with an option for presenting related content (e.g., a web document) on a virtual display interface.

More generally, the AR engine may be configured to monitor user interactions with the real display device, and the request to display the virtual information may comprise a detected user interaction input. The user interaction input may be contact-based (e.g., a touch gesture on an input surface associated with the real display device) or non-contact-based. For example, the user interaction input may be one of a drag-and-drop gesture using an input device (e.g., a keyboard, mouse, touchpad, etc.), a gesture for moving one or more UI elements displayed on a display area of the real display device, or a gesture for moving one or more virtual UI elements shown as overlay on the real display device in AR.

In some embodiments, the AR engine may obtain sensor data of sensors for tracking gestures of the user in the real-world environment, and user interactions with the real display device may be detected based on the obtained sensor data. In particular, the user interactions may comprise gestures of the user which may be identified based on the sensor data. The sensors may comprise one or more cameras, LiDAR array, eye trackers, hand trackers, and the like. The AR engine may be configured to retrieve the sensor data in real-time by, for example, querying data stores associated with the sensors. The sensors may be associated with the AR device, or they may be disposed in the surrounding environment of the real display device. For example, the sensors may be built-in components of the AR device, and sensor data may be collected during use of the AR device. Additionally, or alternatively, the sensors may be part of equipment that is set up at different locations in a proximity of the real display device in the real world.

The virtual information is requested to be displayed in AR at the second relative position with respect to the position of the real display device. The second relative position represents a designated location in the real world. In at least some embodiments, the second relative position may be determined based on an end position associated with a detected user interaction input. For example, a user may indicate the second relative position by performing a gesture, such as a swipe, drag-and-drop, and the like, that ends at a specific location. This end position of the gesture may represent the user's desired location for displaying the virtual information. The AR engine may determine the end position based on sensor data of sensors, such as finger and hand trackers, that are designed to recognize gestures using fingers and hands.

Responsive to receiving the request to display the virtual information, the AR engine determines a displayable area associated with the second relative position, in operation 306. In some embodiments, the displayable area comprises a virtual display screen overlaid on a view of the real-world environment. The displayable area may be associated with a particular virtual display interface that is viewable in AR. The AR engine may generate display data representing the virtual display interface as overlay content for the real-world view. This overlay content may be provided in AR scenes depicting the real display device. The requested virtual information may then be superimposed on the representation of the virtual display interface in AR. In particular, the virtual information may be overlaid on at least a portion of a defined display area (e.g., display screen) associated with the virtual display interface.

In operation 308, the AR engine causes the virtual information to be overlaid on the displayable area in the AR version of the real-world environment. In some embodiments, the virtual information may be presented as overlay content for a virtual display screen that is viewable in AR. The display content associated with the virtual information is transmitted, by the AR engine, to the user's AR device. The AR device, in turn, provides the virtual information as overlay content in real-time. In particular, the AR device provides both the display content corresponding to a virtual display interface and the requested virtual information in AR scenes of the real-world environment surrounding the real display device.

Figure 4:
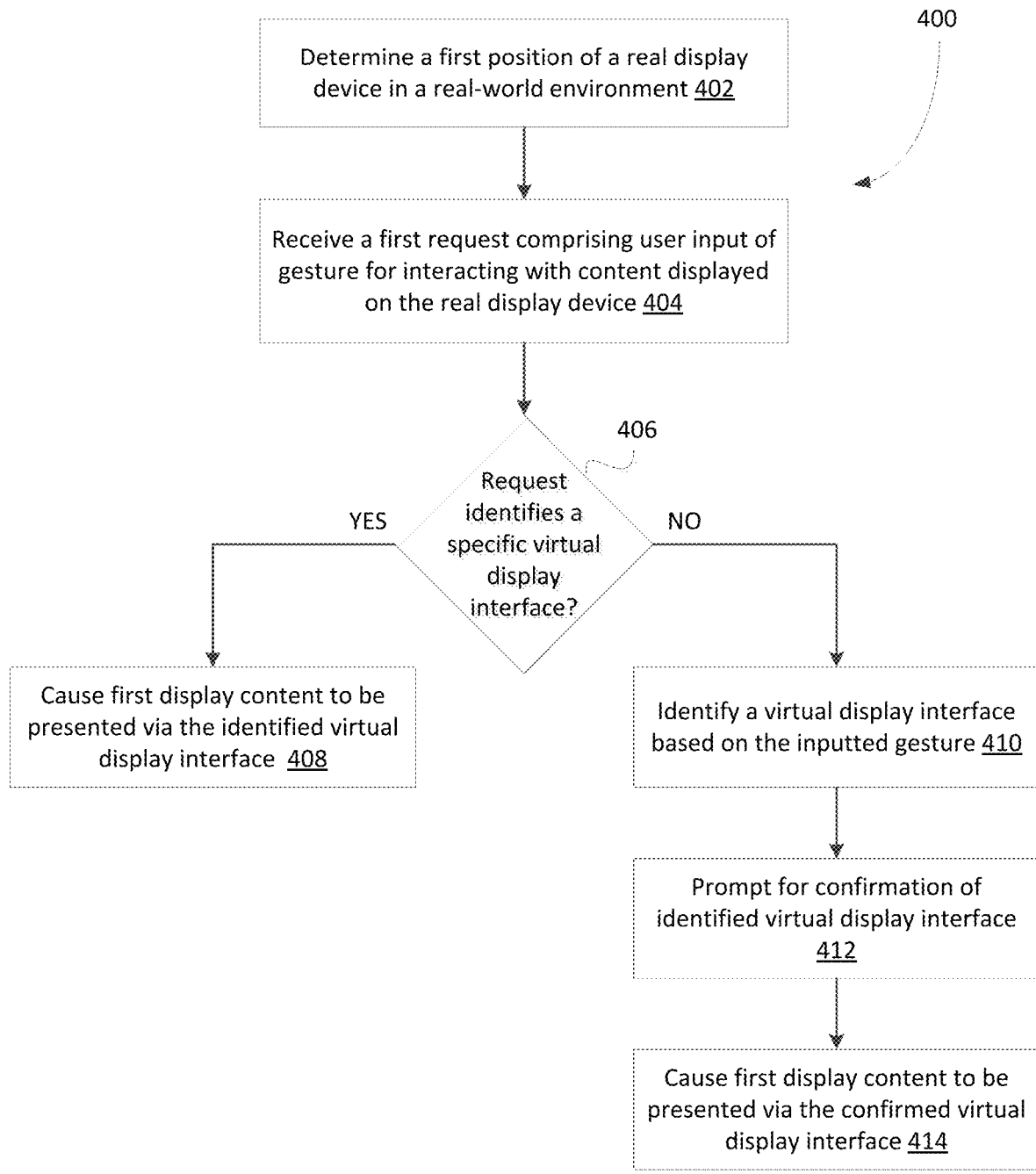
FIG. 4 shows, in flowchart form, an example method for controlling display of information on real and virtual display devices in AR.

Reference is now made to FIG. 4, which shows, in flowchart form, an example method 400 for controlling display of information on real and virtual display devices in AR. The method 400 may be performed by a computing system that supports generation of AR content, such as the AR engine 210 of FIG. 1. As detailed above, an AR engine may be a service that is provided within or external to an e-commerce platform. An AR engine may implement the operations of method 400 as part of a process for generating and calibrating AR scenes. The operations of method 400 may be performed in addition to, or as alternatives of, one or more operations of method 300.

In certain contexts, it may be desirable to provide multiple virtual display interfaces in AR. A user may wish to view information on a real display device as well as on a plurality of virtual display interfaces. The real display device may serve as an anchor for positioning the virtual display interfaces as well as the content that is presented via those virtual display interfaces. The user may designate display content to different ones of the virtual display interfaces for presenting thereon. In particular, the user may indicate an identity of a virtual display interface and display content for viewing on the virtual display interface in AR.

The AR engine determines a first position of a real display device in a real-world environment, in operation 402. As described above, the first position may be represented in real-world coordinates corresponding to a location of the real display device in the real world. The real-world coordinates may, for example, be derived based on processing images/videos depicting the real display device in order to identify image coordinates, and applying a suitable transform to the image coordinates to obtain the real-world coordinates.

In operation 404, the AR engine receives a first request comprising user input of a gesture for interacting with the real display device. Specifically, a gesture for interacting with content displayed on the real display device is detected by the AR engine. For example, a touch gesture may be inputted on a touch-sensitive interface associated with the real display device, and an indication of information that is selected by the touch gesture may be provided to the AR engine. The indication of the selection may be transmitted, for example, by a processor associated with the real display device. As another example, a swipe or drag-and-drop gesture may be inputted on an input interface associated with the real display device. The swipe or drag-and-drop gesture may represent a request for information displayed on the real display device to be "moved" to a displayable area in AR, such as a display screen of a virtual display interface. For example, user interface elements, such as virtual screens (for display of 2D content), application windows or subwindows (e.g., a toolbar for an application), or other OS features (e.g., a widget, notification pane, and the like) may be caused to move from a display area of the real display device to one or more virtual displays.

The AR engine determines whether the request identifies a specific virtual display interface, in operation 406. In particular, request data of the request may be analyzed to determine whether a specific virtual display interface for displaying the requested information is designated by the request. By way of example, the request data may include an indication of an identifier (e.g., device identifier, real-world coordinates, etc.) for a virtual display interface that is provided in AR.

If a specific virtual display interface is identified by the request, the AR engine causes a first display content to be presented via the identified virtual display interface, in operation 408. The first display content may comprise information (e.g., a web document) corresponding to the user selection associated with the request. The AR engine may provide the first display content as an overlay for the identified virtual display interface. In particular, the AR engine may transmit, to the user's AR device, display data associated with the first display content and instructions for superimposing the display data on a real-world view of the real display device.

On the other hand, if no virtual display interface is associated with the request, the AR engine identifies a specific virtual display interface based on the inputted gesture, in operation 410. In particular, the AR engine may be configured to use information about the inputted gesture for identifying the user's likely choice of virtual display interface. In some embodiments, the AR engine may obtain motion information associated with the inputted gesture and determine, based at least in part on the motion information, which virtual display interface is desired to be selected by the user. For example, the AR engine may use information, such as an end position and direction of a swipe gesture, in order to identify a set of one or more candidate virtual display interfaces associated with the inputted gesture.

In operation 412, the AR engine prompts for confirmation of the identified virtual display interface. That is, the user of the AR device may be prompted to confirm the engine-selected virtual display as the desired output interface for presenting the requested information. For example, a request to select one of a set of candidate virtual display interfaces may be provided to the user (e.g., via a display of the AR device). The AR engine then causes the first display content to be presented via the virtual display interface that is confirmed as the user's choice, in operation 414.

Figure 5:
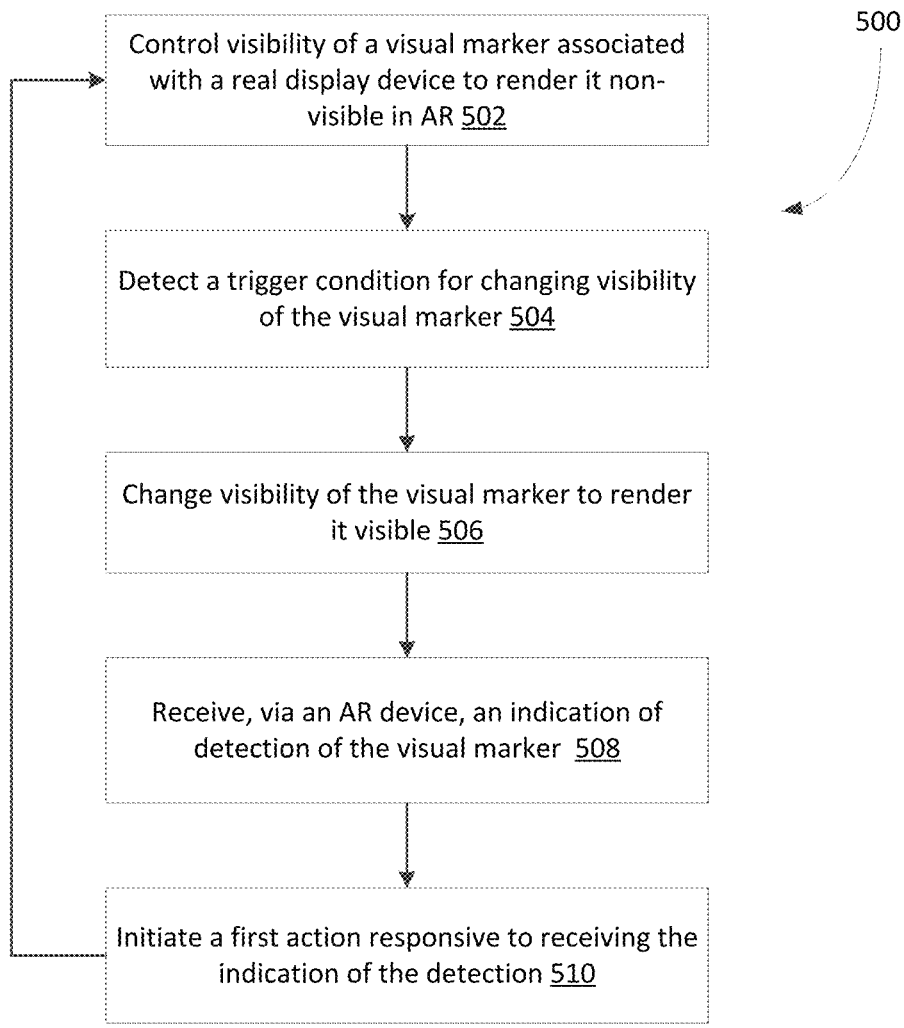
FIG. 5 shows, in flowchart form, an example method for calibrating AR scenes.

Reference is now made to FIG. 5, which shows, in flowchart form, an example method 500 calibrating AR scenes. The method 500 may be performed by a computing system that supports generation of AR content, such as the AR engine 210 of FIG. 1. As detailed above, an AR engine may be a service that is provided within or external to an e-commerce platform. An AR engine may implement the operations of method 500 as part of a process for generating and calibrating AR scenes. The operations of method 500 may be performed in addition to, or as alternatives of, one or more of the operations of methods 300 and 400.

The AR engine may be configured to control the visibility of a visual marker that is associated with a real display device. The visual marker may, for example, be a fiducial that is printed on, attached to, or otherwise physically disposed on the real display device. The AR engine may render the visual marker non-visible in AR, in operation 502. In some embodiments, the AR engine may provide AR overlay content that occludes the visual marker in order to control its visibility. For example, the visual marker may be rendered visible, i.e., detectable by a user of the AR device, by removing the occluding AR overlay, and non-visible by superimposing the overlay content on the visual marker.

In operation 504, the AR engine detects a trigger condition for changing visibility of the visual marker. In some embodiments, the trigger condition may be a loss of positional synchronization, i.e., correspondence of position, between the AR device and the real display device. For example, if the user of the AR device moves away from the real display device or if the real display device is removed from its fixed location, the positional synchronization may be lost. Additionally, or alternatively, the trigger condition may be a request to launch a certain defined action. For example, the visual marker may be associated with one or more actions that can be launched based on recognition of the appearance (e.g., pattern) of the visual marker.

Upon detecting a defined trigger condition, the AR engine changes visibility of the visual marker to render it visible, in operation 506. For example, the AR engine may remove an occluding AR overlay associated with the visual marker such that the visual marker becomes at least partially detectable by sensors of the user's AR device.

In operation 508, the AR engine receives, via an AR device, an indication of detection of the visual marker. For example, the cameras of the AR device may capture images that are used by the AR device for detecting the visual marker using suitable object detection techniques. In some embodiments, the AR engine may be configured to obtain image data that is captured using cameras associated with the AR device and determine a presence of the visual marker in the image data.

In operation 510, the AR engine initiates a first action responsive to receiving the indication of the detection. For example, the AR engine may cause an AR scene to be positionally synchronized based on information associated with the detected visual marker. The visual marker may be associated with relative information describing the location, orientation, and/or scale of the marker with respect to the real display device. For example, the visual marker may encode or be stored in association with the relative information for the corresponding real display device. The visual marker may be associated with additional information (e.g., device type, authenticated users, unique identifier, etc.) relating to the real display device.

Figure 6:
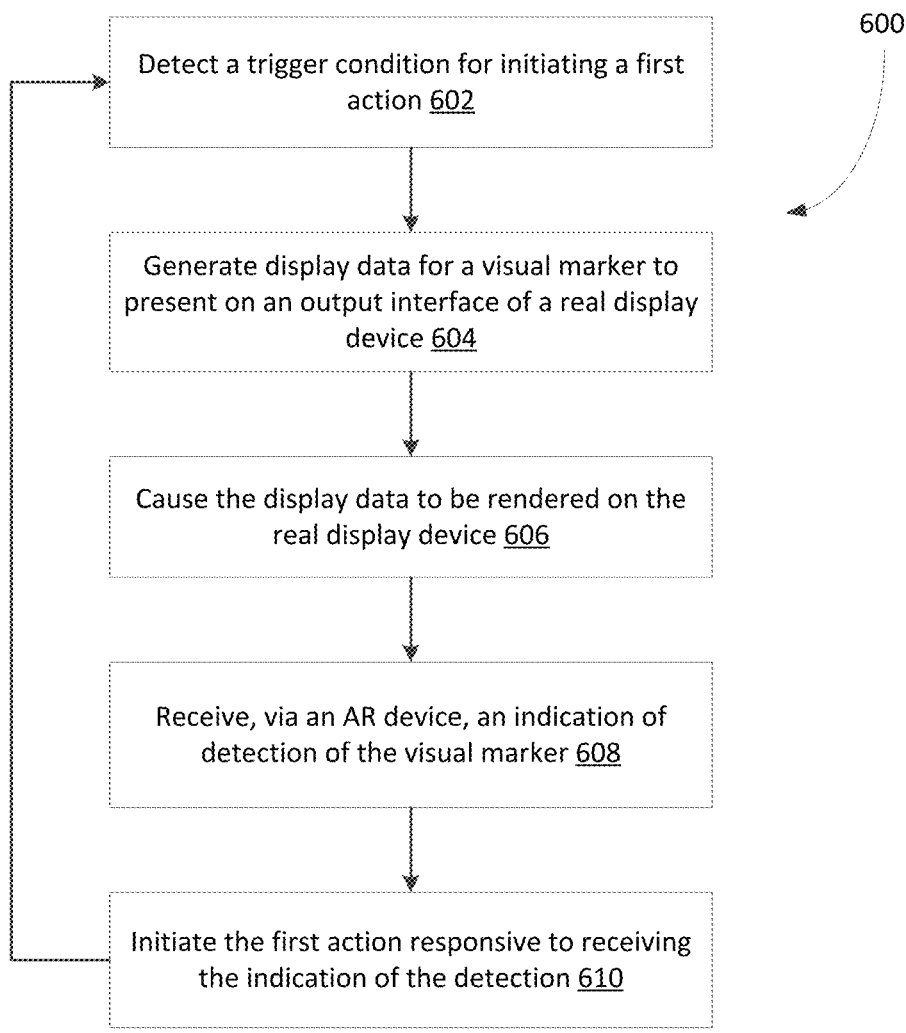
FIG. 6 shows, in flowchart form, another example method for calibrating AR scenes.

Reference is now made to FIG. 6, which shows, in flowchart form, another example method 600 for calibrating AR scenes. The method 600 may be performed by a computing system that supports generation of AR content, such as the AR engine 210 of FIG. 1. As detailed above, an AR engine may be a service that is provided within or external to an e-commerce platform. An AR engine may implement the operations of method 600 as part of a process for generating and calibrating AR scenes. The operations of method 600 may be performed in addition to, or as alternatives of, one or more of the operations of methods 300 to 500.

Visual markers may, in some embodiments, be software-generated. A software-generated, or virtual, marker may be controllable using a computer so as to adjust the appearance (e.g., shape, color, and the like), location on screen, etc. of the marker as desired.

In operation 602, the AR engine detects a trigger condition for initiating a first action. The trigger action may be, for example, a loss of positional synchronization between a user's AR device and a real display device that is viewed in AR. Another example of a trigger is a request for launching a certain defined action in connection with the real display device.

The AR engine generates display data for a visual marker to present on an output interface of a real display device, in operation 604. Specifically, display data for a software-generated, virtual marker is generated. In operation 606, the AR engine causes the display data to be rendered on the real display device. For example, the virtual marker may be caused to be displayed on the real display device to allow calibration of positions of the AR device and the real display device. The virtual marker may be displayed for a defined period of time or until dismissed by a user of the AR device. For example, the virtual marker may be displayed only briefly such that it is not visually noticeable and still detectable, e.g., by virtue of persistence of vision. In some embodiments, the virtual marker may be persistently displayed on the real display device. Alternatively, the virtual marker may be caused to be only as necessary—such "ephemeral" visual marker may be displayed, for example, periodically or upon detecting a calibration drift.

The AR engine receives, via an AR device, an indication of detection of the visual marker, in operation 608. For example, the cameras of the AR device may capture images that are used by the AR device for detecting the visual marker using suitable object detection techniques. In some embodiments, the AR engine may be configured to obtain image data that is captured using cameras associated with the AR device and determine a presence of the visual marker in the image data.

In operation 610, the AR engine initiates the first action responsive to receiving the indication of the detection. For example, the AR engine may cause an AR scene to be positionally synchronized based on information associated with the detected visual marker. The visual marker may be associated with relative information describing the location, orientation, and/or scale of the marker with respect to the real display device. For example, the visual marker may encode or be stored in association with the relative information for the corresponding real display device. The visual marker may be associated with additional information (e.g., device type, authenticated users, unique identifier, etc.) relating to the real display device.

In some embodiments, responsive to determining that positional synchronization between the AR device and a real display device is lost, the synchronization anchor may be updated. For example, the AR engine may determine a defined third position in the real-world environment and cause AR scenes to be positionally synchronized relative to the defined third position. The third position may be one of: a last stored position of the real display device; a location of a detectable landmark in the AR version of the real-world environment; or a current position of an AR-enabled computing device. For example, the last known real-world position of the anchoring real object may be set as the current anchor position. As another example, an AR-enabled computing device used for viewing in AR may itself be set as the current anchor, such that virtual display spaces appear in fixed positions in the field of view. In some implementations, the AR engine may "close" one or more of the virtual display spaces or otherwise cease displaying them (e.g., by minimizing, replacing with representative UI element(s), replacing with a "lock screen", etc.). As another example, a different real-world object (e.g., a display screen mounted on a wall) and/or associated visual markers may be set as an anchor.

Figure 7A:
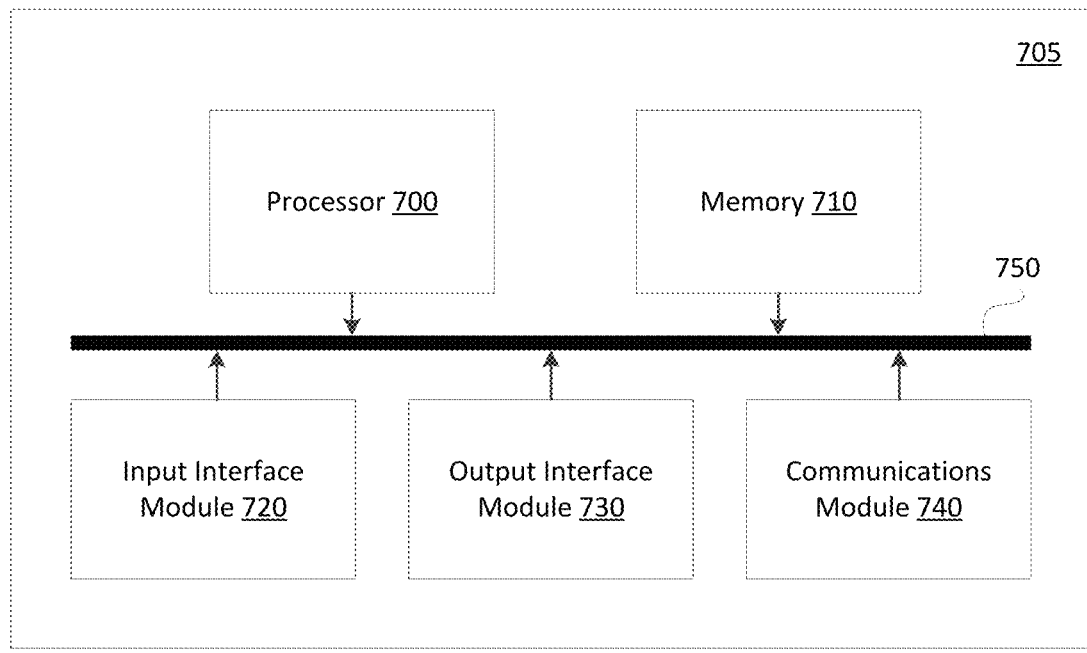
FIG. 7A is a high-level schematic diagram of an example computing device.

The above-described methods may be implemented by way of a suitably programmed computing device. FIG. 7A is a high-level operation diagram of an example computing device 705. The example computing device 705 includes a variety of modules. For example, as illustrated, the example computing device 705, may include a processor 700, a memory 710, an input interface module 720, an output interface module 730, and a communications module 740. As illustrated, the foregoing example modules of the example computing device 705 are in communication over a bus 750.

The processor 700 is a hardware processor. The processor 700 may, for example, be one or more ARM, Intel x86, PowerPC processors or the like.

The memory 710 allows data to be stored and retrieved. The memory 710 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 705.

The input interface module 720 allows the example computing device 705 to receive input signals. Input signals may, for example, correspond to input received from a user. The input interface module 720 may serve to interconnect the example computing device 705 with one or more input devices. Input signals may be received from input devices by the input interface module 720. Input devices may, for example, include one or more of a touchscreen input, keyboard, trackball or the like. In some embodiments, all or a portion of the input interface module 720 may be integrated with an input device. For example, the input interface module 720 may be integrated with one of the aforementioned examples of input devices.

The output interface module 730 allows the example computing device 705 to provide output signals. Some output signals may, for example, allow provision of output to a user. The output interface module 730 may serve to interconnect the example computing device 705 with one or more output devices. Output signals may be sent to output devices by output interface module 730. Output devices may include, for example, a display screen such as, for example, a liquid crystal display (LCD), a touchscreen display. Additionally, or alternatively, output devices may include devices other than screens such as, for example, a speaker, indicator lamps (such as for example, light-emitting diodes (LEDs)), and printers. In some embodiments, all or a portion of the output interface module 730 may be integrated with an output device. For example, the output interface module 730 may be integrated with one of the aforementioned example output devices.

The communications module 740 allows the example computing device 705 to communicate with other electronic devices and/or various communications networks. For example, the communications module 740 may allow the example computing device 705 to send or receive communications signals. Communications signals may be sent or received according to one or more protocols or according to one or more standards. For example, the communications module 740 may allow the example computing device 705 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 740 may allow the example computing device 705 to communicate using near-field communication (NFC), via Wi-Fi™, using Bluetooth™ or via some combination of one or more networks or protocols. Contactless payments may be made using NFC. In some embodiments, all or a portion of the communications module 740 may be integrated into a component of the example computing device 705. For example, the communications module may be integrated into a communications chipset.

Software comprising instructions is executed by the processor 700 from a computer-readable medium. For example, software may be loaded into random-access memory from persistent storage of memory 710. Additionally, or alternatively, instructions may be executed by the processor 1000 directly from read-only memory of memory 710.

Figure 7B:
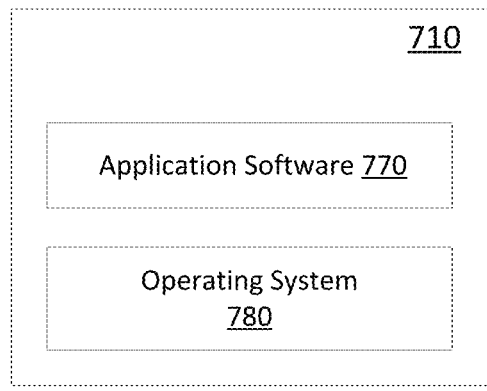
FIG. 7B shows a simplified organization of software components stored in a memory of the computing device of FIG. 7A.

FIG. 7B depicts a simplified organization of software components stored in memory 1010 of the example computing device 705. As illustrated these software components include an operating system 780 and application software 770.

The operating system 780 is software. The operating system 780 allows the application software 770 to access the processor 700, the memory 710, the input interface module 720, the output interface module 730, and the communications module 740. The operating system 780 may be, for example, Apple™ OS X, Android™, Microsoft™ Windows™, a Linux distribution, or the like.

The application software 770 adapts the example computing device 705, in combination with the operating system 780, to operate as a device performing particular functions.

Example E-Commerce Platform

Although not required, in some embodiments, the methods disclosed herein may be performed on or in association with an e-commerce platform. An example of an e-commerce platform will now be described.

Figure 8:
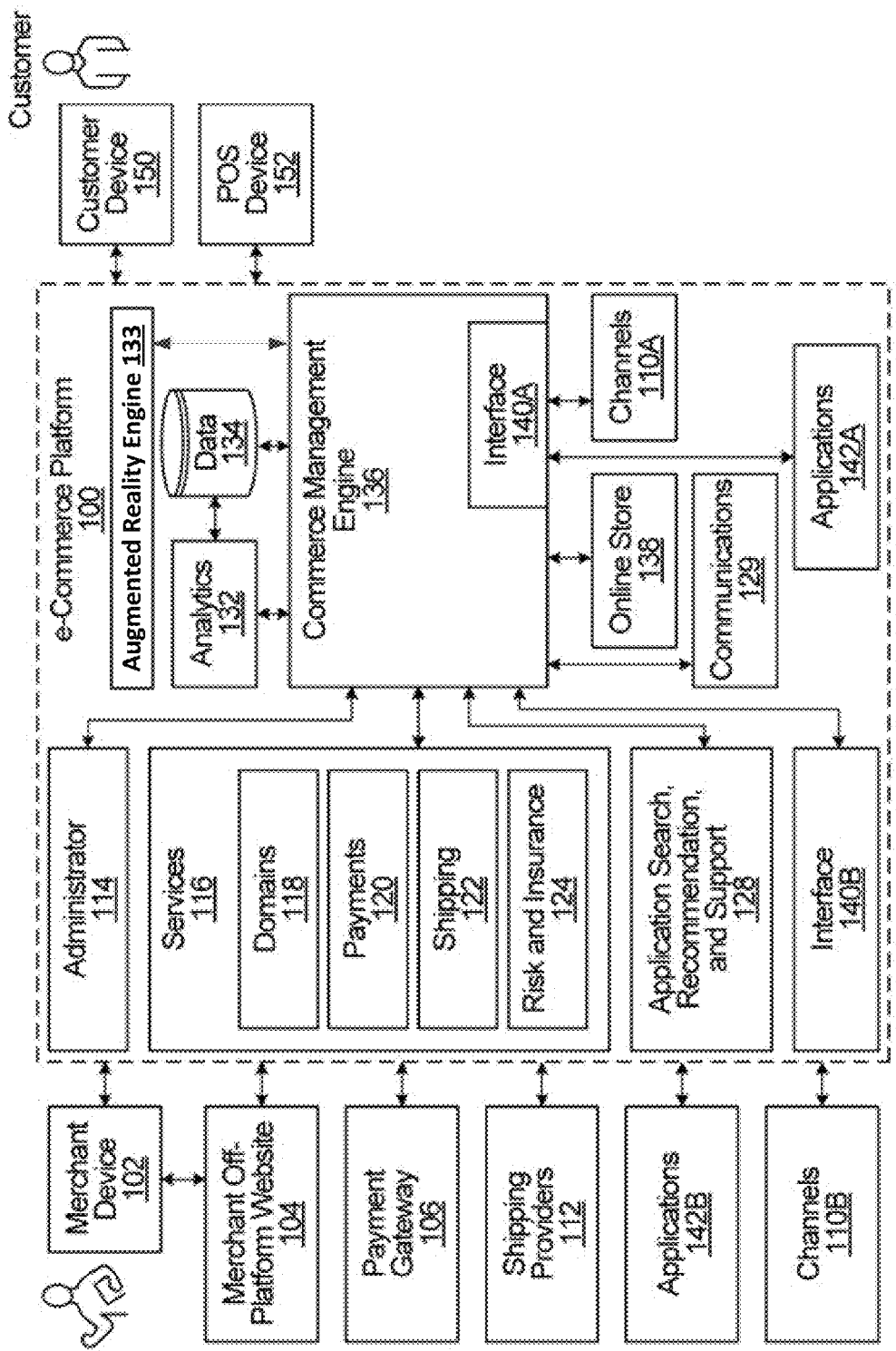
FIG. 8 is a block diagram of an e-commerce platform, in accordance with an example embodiment.

FIG. 8 illustrates an example e-commerce platform 100, according to one embodiment. The e-commerce platform 100 may be exemplary of the e-commerce platform 205 described with reference to FIG. 2. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as an AR device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, additionally or alternatively, be provided by one or more providers/entities.

In the example of FIG. 8, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure, the terms online store and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a transitory memory such as for example, random access memory (RAM), and/or a non-transitory memory such as, for example, a non-transitory computer readable medium such as, for example, persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to AR devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally, or alternatively, it may be that themes can, additionally or alternatively, be customized using theme-specific settings such as, for example, settings that may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 9:
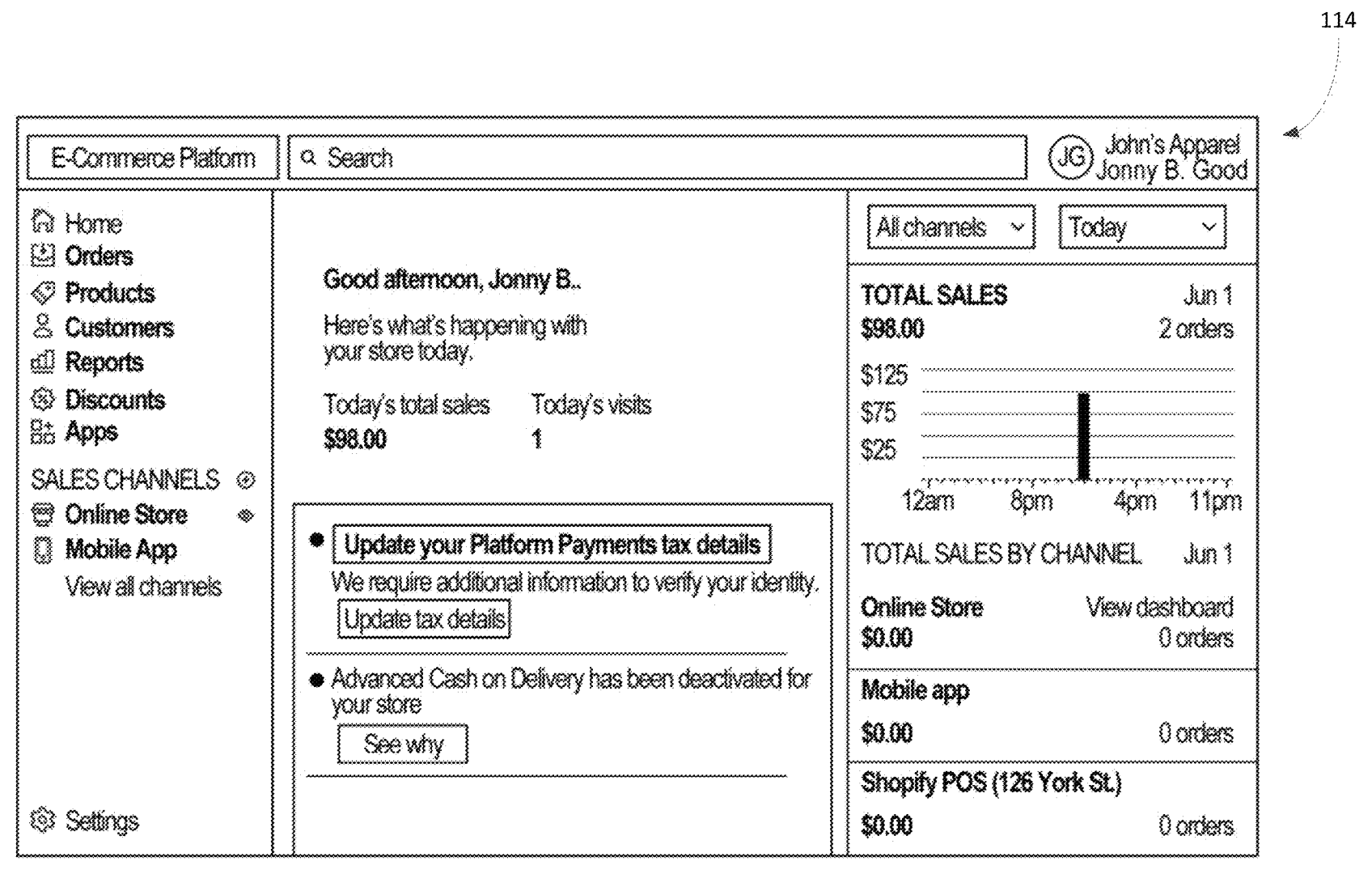

FIG. 9 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 9. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as. for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 8, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

The e-commerce platform 100 may implement an augmented reality engine 133 which may be configured to support at least some of the functions of the AR engine 210 of FIG. 2 described above.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Implementations

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g., Long-Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method, comprising:
   determining a first position of a real display device in a real-world environment;
   selectively causing to be displayed, on a displayable area associated with the real display device, a software-generated virtual visual marker for use in positional synchronization of an AR scene, wherein the virtual visual marker encodes a unique identifier of the real display device and at least one of location, orientation, or scale of the virtual visual marker relative to the real display device and wherein the virtual visual marker is caused to be displayed in response to detecting a calibration drift;
   receiving a request to display virtual information on a virtual display at a second relative position with respect to the first position in an AR version of the real-world environment;
   responsive to receiving the request:
      determining a displayable area of the virtual display in the AR scene, wherein determining the displayable area comprises:
         detecting the virtual visual marker in image data depicting the real display device; and
         causing the displayable area of the virtual display to be anchored on the real display device based on the detected virtual visual marker; and
      causing the virtual information to be overlaid on the displayable area in the AR version of the real-world environment.

2. The method of claim 1, wherein determining the first position comprises determining real-world space coordinates associated with a location of the real display device in the real-world environment.

3. The method of claim 1, further comprising monitoring user interaction with the real display device, wherein the request to display the virtual information comprises a detected user interaction input associated with the real display device.

4. The method of claim 3, wherein the user interaction input comprises one of: a drag-and-drop gesture using an input device; a gesture for moving one or more UI elements displayed on a display area of the real display device; or a gesture for moving one or more virtual UI elements shown as overlay on the real display device in AR.

5. The method of claim 3, wherein the second relative position is determined based on an end position associated with the detected user interaction input.

6. The method of claim 1, further comprising obtaining sensor data of sensors for tracking gestures of the user, wherein gestures of the user in the real-world environment are detected based on the obtained sensor data.

7. The method of claim 6, wherein the sensors comprise at least one of: cameras; LiDAR array; eye trackers; or hand trackers.

8. The method of claim 1, wherein the virtual visual marker comprises at least one of a pattern or a fiducial.

9. The method of claim 1, further comprising:
determining that a positional synchronization with the real display device has been lost;
responsive to determining that the positional synchronization has been lost:
   obtaining image data captured using cameras associated with an AR-enabled computing device;
   detecting the virtual visual marker in the image data; and
   causing the AR scene to be positionally synchronized based on the detected virtual visual marker.

10. The method of claim 1, further comprising:
determining that a positional synchronization with the real display device has been lost;
responsive to determining that the positional synchronization has been lost:
   determining a defined third position in the real-world environment; and
   causing the AR scene to be positionally synchronized relative to the defined third position.

11. The method of claim 10, wherein the defined third position comprises one of: a last stored position of the real display device; a location of a detectable landmark in the AR version of the real-world environment; or a current position of an AR-enabled computing device.

12. The method of claim 1, wherein the displayable area of the virtual display comprises a virtual display screen overlaid on a view of the real-world environment.

13. The method of claim 1, wherein causing the virtual visual marker to be displayed comprises:
   detecting a trigger condition for changing visibility of the virtual visual marker;
   in response to detecting the trigger condition, generating display data for the virtual visual marker; and
   causing the display data to be rendered on the real display device.

14. A computing system, comprising:
a processor;
a memory coupled to the processor, the memory storing computer-executable instructions that, when executed by the processor, configure the processor to:
   determine a first position of a real display device in a real-world environment;
   selectively cause to be displayed, on a displayable area associated with the real display device, a software-generated virtual visual marker for use in positional synchronization of an AR scene, wherein the virtual visual marker encodes a unique identifier of the real display device and at least one of location, orientation, or scale of the virtual visual marker relative to the real display device and wherein the virtual visual marker is caused to be displayed in response to detecting a calibration drift;
   receive a request to display virtual information at a second relative position with respect to the first position in an AR version of the real-world environment;
   responsive to receiving the request:
      determine a displayable area of the virtual display in the AR scene, wherein determining the displayable area comprises:
         detecting the virtual visual marker in image data depicting the real display device; and
         causing the displayable area of the virtual display to be anchored on the real display device in the AR scene based on the detected virtual visual marker; and
      cause the virtual information to be overlaid on the displayable area in the AR version of the real-world environment.

15. The computing system of claim 14, wherein determining the first position comprises determining real-world space coordinates associated with a location of the real display device in the real-world environment.

16. The computing system of claim 14, wherein the instructions, when executed by the processor, further configure the processor to monitor user interaction with the real display device, wherein the request to display the virtual information comprises a detected user interaction input associated with the real display device.

17. The computing system of claim 16, wherein the user interaction input comprises one of: a drag-and-drop gesture using an input device; a gesture for moving one or more UI elements displayed on a display area of the real display device; or a gesture for moving one or more virtual UI elements shown as overlay on the real display device in AR.

18. The computing system of claim 16, wherein the second relative position is determined based on an end position associated with the detected user interaction input.

19. The computing system of claim 14, wherein the instructions, when executed by the processor, further configure the processor to obtain sensor data of sensors for tracking gestures of the user, wherein gestures of the user in the real-world environment are detected based on the obtained sensor data.

20. A non-transitory, computer-readable medium storing computer-executable instructions that, when executed by a processor, configure the processor to:
   determine a first position of a real display device in a real-world environment;
   selectively cause to be displayed, on a displayable area associated with the real display device, a software-generated virtual visual marker for use in positional synchronization of an AR scene, wherein the virtual visual marker encodes a unique identifier of the real display device and at least one of location, orientation, or scale of the virtual visual marker relative to the real display device and wherein the virtual visual marker is caused to be displayed in response to detecting a calibration drift;
   receive a request to display virtual information at a second relative position with respect to the first position in an AR version of the real-world environment;
   responsive to receiving the request:
      determine a displayable area associated with the second relative position of the virtual display in the AR scene, wherein determining the displayable area comprises:
         detecting the virtual visual marker in image data depicting the real display device; and
         causing the displayable area of the virtual display to be anchored on the real display device in the AR scene based on the detected virtual visual marker; and
      cause the virtual information to be overlaid on the displayable area in the AR version of the real-world environment.

* * * * *